(12) United States Patent
Berard

(10) Patent No.: US 7,239,670 B2
(45) Date of Patent: Jul. 3, 2007

(54) PRE-EMPHASIS OF TMDS SIGNALLING IN VIDEO APPLICATIONS

(75) Inventor: Richard S. Berard, Pasadena, CA (US)

(73) Assignee: Broadcom Corporation, Irvine, CA (US)

( * ) Notice: Subject to any disclaimer, the term of this patent is extended or adjusted under 35 U.S.C. 154(b) by 832 days.

(21) Appl. No.: 10/316,581

(22) Filed: Dec. 11, 2002

(65) Prior Publication Data
US 2004/0125886 A1    Jul. 1, 2004

(51) Int. Cl.
*H04L 25/29* (2006.01)
(52) U.S. Cl. ...................................... 375/296
(58) Field of Classification Search .................. 455/39, 455/73, 91, 114.2, 114.3, 115.1, 115.2, 115.3; 375/228, 259, 295, 296, 316, 297, 346, 377; 330/144, 149, 75, 85; 333/12; 369/47.15, 369/0.1, 60.01, 61, 62; 370/241, 242; 379/406.01, 379/406.06, 406.07, 406.08, 398
See application file for complete search history.

(56) References Cited

U.S. PATENT DOCUMENTS

| | | | | |
|---|---|---|---|---|
| 5,648,989 A | * | 7/1997 | Ko | ............................ 375/296 |
| 6,069,610 A | * | 5/2000 | Denda et al. | ............... 345/694 |
| 6,560,459 B1 | * | 5/2003 | Wong | ........................ 455/447 |
| 6,584,144 B2 | * | 6/2003 | Alamouti et al. | ........... 375/147 |

FOREIGN PATENT DOCUMENTS

WO    WO 02/27964    4/2002

OTHER PUBLICATIONS

Marco Lops et al., "Narrow-Band-Interference Suppression in Multiuser CDMA Systems", *IEEE Transactions On Communications*, vol. 46, No. 9, Sep. 1998, pp. 1163-1175.
Jeffrey A. Young et al., "Analysis of DFT-Based Frequency Excision Algorithms for Direct-Sequence Spread-Spectrum Communications", *IEEE Transactions On Communications*, vol. 46, No. 8, Aug. 1998, pp. 1076-1087.

* cited by examiner

*Primary Examiner*—Pankaj Kumar
(74) *Attorney, Agent, or Firm*—McAndrews, Held & Malloy Ltd.

(57) ABSTRACT

The present invention relates to a system and method for improving the waveform at a receiver. More specifically, the present invention relates to a system adapted to modify at least one signal in anticipation of channel attenuation and delay. The present invention comprises a memory adapted to store at least one coefficient that is pre-determined based on at least one expected degradation characteristic of a channel; and a pre-emphasizer communicating with at least the memory and the channel, and adapted to modify the at least one signal using the at least one coefficient prior to transmission of the at least one signal over the channel, compensating for the at least one expected degradation characteristic.

11 Claims, 10 Drawing Sheets

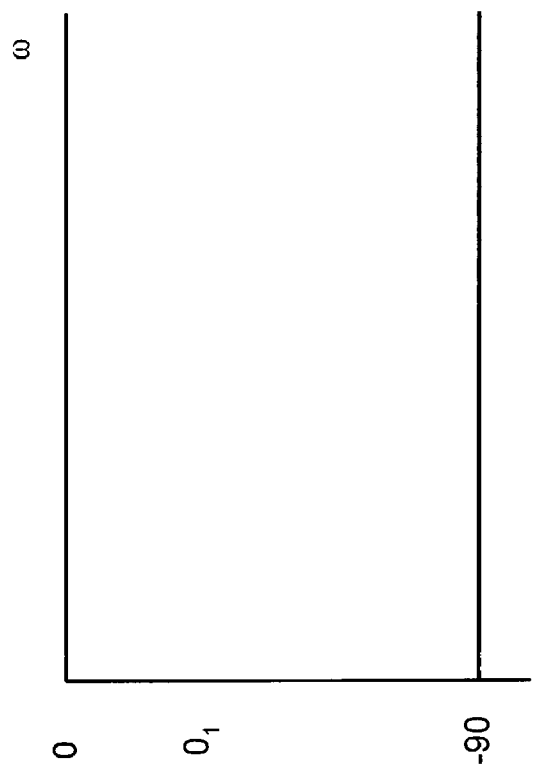
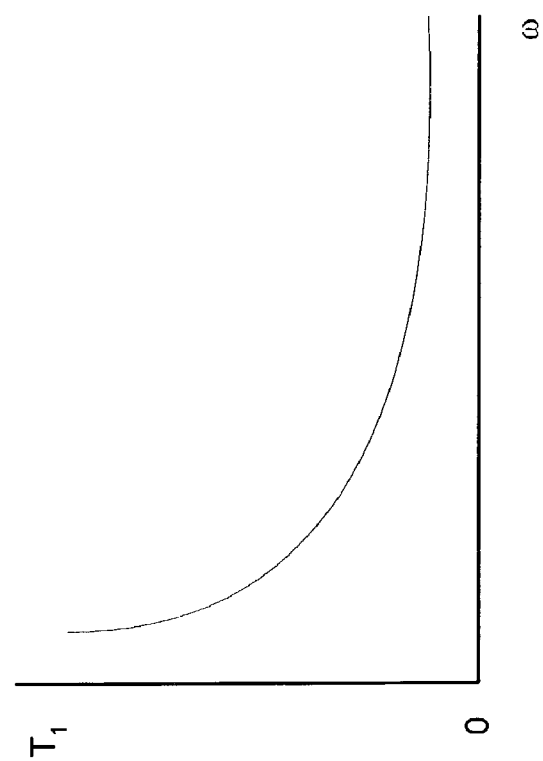
Fig. 1B
Fig. 1A

PRE-EMPHASIS OF TMDS SIGNALLING IN VIDEO APPLICATIONS

CROSS-REFERENCE TO RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This invention relates to transmitting digital video data. In the DVI 1.0 specification, which is incorporated herein by reference, digital video data is transmitted over a two-wire interface in a "complimentary" or "differential" manner. A channel is used to transmit the data, where the channel comprises all electrical connections and components between the transmitter and the receiver, including but not limited to the package, pcbs, connectors, and cables. It is contemplated that the channel may distort the transmitted signal through attenuation and delay, where attenuation and delay are a function of frequency.

This distortion may result in an eye diagram that is more closed than would be the case if no distortion were present. Furthermore, the channel and its associated distortion will vary with the configuration/implementation of the varying transmitter sources, cables and receiver systems. Known prior art emphasizes improving the channel to cause less distortion and improving receiver sensitivity to interpret the signal accurately in the presence of distortion. These approaches add significantly to the cost of system implementation.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

The present invention relates to a system and method for improving the waveform at a receiver. More specifically, the present invention relates to a system and method adapted to pre-emphasize at least one transmitted signal prior to transmission such that the distortion and attenuation of the channel restores the desired waveform.

One embodiment of the present invention relates to a system and method for improving the waveform at a receiver. More specifically, the present invention relates to a system adapted to modify at least one signal in anticipation of attenuation and delay of a channel. The system comprises a memory adapted to store at least one coefficient that is pre-determined based at least in part on at least one expected degradation characteristic of a channel, and a pre-emphasizer (a buffer/amplifier for example) that communicates with at least the memory and the channel, and is adapted to modify the at least one signal using the at least one coefficient prior to transmission of the at least one signal over the channel, compensating for the at least one expected degradation characteristic.

Another embodiment of the present invention comprises a graphics engine that communicates with at least the memory and is adapted to generate the at least one signal. A signal formatter communicates with at least the pre-emphasizer and is adapted to format the at least one signal. It is contemplated that the transmitter comprises a user interface communicating therewith and is adapted to select the at least one coefficient. It is further contemplated that the at least one expected degradation characteristic comprises at least one of attenuation and delay.

Still another embodiment of the present invention relates to a communication system adapted to display at least one signal. This embodiment comprises a channel and first and second communication nodes. In this embodiment, the first communication node communicates with the channel and is adapted to modify the at least one signal using at least one coefficient that is predetermined based, at least in part, on at least one expected degradation characteristic prior to transmission over the channel, to compensate for the at least one expected degradation characteristic. The second communication node also communicates with the channel and is adapted to receive and display the at least one signal.

In one embodiment, the first communication node comprises a transmitter (a set-top box for example) while the second communication node comprises a receiver (a display for example). The first communication node may comprise at least a pre-emphasizer (a buffer/amplifier for example) adapted to modify the at least one signal using the at least one coefficient and a memory that communicates with at least the pre-emphasis or is adapted to store the at least one coefficient. In this embodiment, the first communication node may comprise a graphics engine adapted to generate the at least one signal and a signal formatter that communicates with at least the graphics engine and pre-emphasizer and adapted to format the signal. It is further contemplated that the at least one expected degradation characteristic waveform comprises at least one of attenuation and delay.

Yet another embodiment of the present invention relates to a method for improving a waveform at a receiver. This method comprises determining at least one expected degradation characteristic of a channel prior to generating a signal for transmission. The method further comprises modifying the generated signal based at least in part on such determination, and after modifying, transmitting the modified signal over the channel.

Still another embodiment comprises modifying the generated signal using at least one coefficient. It is contemplated that modifying the generated signal comprises modifying a power over frequency spectrum proportional to a reciprocal of attenuation of the channel. It is also contemplated that modifying the generated signal comprises adjusting a time of transmission proportional to a difference in propagation delay of the channel. Determining the at least one expected degradation characteristic may comprise determining at least one of attenuation or delay of the channel.

Another embodiment of the present invention relates to a method for improving a waveform at a receiver. This embodiment comprises determining the expected attenuation of at least one channel and generating at least one signal for transmission. The at least one signal is amplified to compensate for such expected attenuation and, after amplifying, the amplified signal is transmitted over the at least one channel.

Still another embodiment of the present invention relates to a method for improving a waveform at a receiver. This embodiment comprises determining the expected delay of at least one channel and generating at least one signal for transmission. At least one component of the at least one signal is delayed to compensate for the expected delay of at least one other component of the at least one signal. After delaying at least one component, the at least one signal is transmitted over the at least one channel.

Yet another embodiment of the present invention relates to a method for improving a waveform at a receiver. This embodiment comprises generating a test signal (a pseudo-random signal for example) for transmission over at least one channel and determining a pixel error rate of such pseudo-random signal. At least one coefficient is selected based at least in part on such pixel error rate. At least one signal is modified using the at least one coefficient and, after such modifying, the at least one modified signal is transmitted over the at least one channel.

Still another embodiment of the present invention relates to a method for improving a waveform at a receiver. This embodiment comprises generating a plurality of test signals (pseudo-random signals for example) for transmission over at least one channel and determining the pixel error rate for each of the pseudo-random signals. At least one coefficient is selected from a plurality of coefficients based at least in part on at least one of such pixel error rates. At least one signal is modified using the at least one coefficient and, after such modifying, the at least one modified signal is transmitted over the at least one channel. It is further contemplated that this embodiment may comprise generating the test signals using a respective one of the plurality of coefficients, wherein selecting at least one coefficient comprises selecting the coefficient whose respective signal results in the lowest pixel error rate.

Yet another embodiment of the present invention relates to a method for improving a waveform at a receiver. This embodiment comprises generating at least one signal having a predetermined signal strength for transmission over at least one channel and measuring the signal strength of at least one signal at the receiver. The degradation of the at least one channel is determined using the predetermined signal strength and measured signal strength (determining the difference between the two for example). At least one coefficient is selected based at least in part on such determined degradation, and at least one signal is modified using the at least one coefficient. After modifying the at least one signal, the at least one modified signal is transmitted over the at least one channel.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIGS. 1A and 1B illustrate graphs depicting examples of attenuation and phase response (i.e., delay) as a function of frequency;

DETAILED DESCRIPTION OF THE INVENTION

It is contemplated that the signal waveform of the TMDS signal used in the transmission of digital video/graphic data from a video source to a video monitor/display/TV may be distorted by the channel. One embodiment of the present invention produces a clean waveform at the receiver by altering the transmitted signal in such a way that the distortion and attenuation of the channel restores the desired waveform. In accordance with one embodiment of the present invention, altering the transmitted signal in anticipation of the channel effects is referred to as "pre-emphasis". In an exemplary embodiment of the present invention, the pre-emphasis characteristics for a plurality of expected channels are predetermined.

Figure 2A:
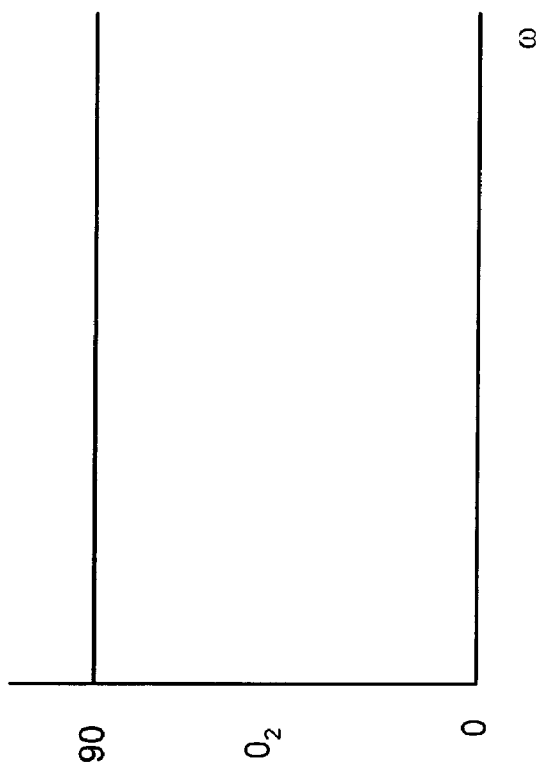
FIGS. 2A and 2B illustrate graphs depicting other examples of attenuation and phase response (i.e., delay) as a function of frequency.
Figure 2B:
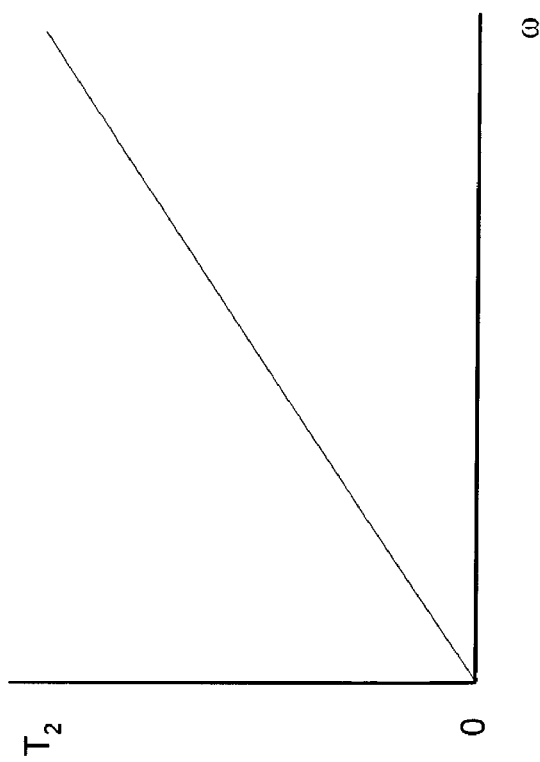

It has been observed that attenuation and delay in a channel is a function of frequency. FIG. 1A illustrates a known Bode Plot depicting one example of attenuation as a function of frequency in a channel, while FIG. 1B illustrates a known Bode Plat of group delay as a function of frequency for the same channel, where phase is related to group delay by phase * 1/f. Likewise, FIG. 2A illustrates another known Bode Plot depicting one example of attenuation as a function of frequency in a different channel, while FIG. 2B illustrates a known Bode Plat of group delay as a function of frequency for the same channel, where again phase is related to group delay by phase * 1/f. The above-described plots illustrate that attenuation and delay in a channel are functions of frequency.

Figure 3:
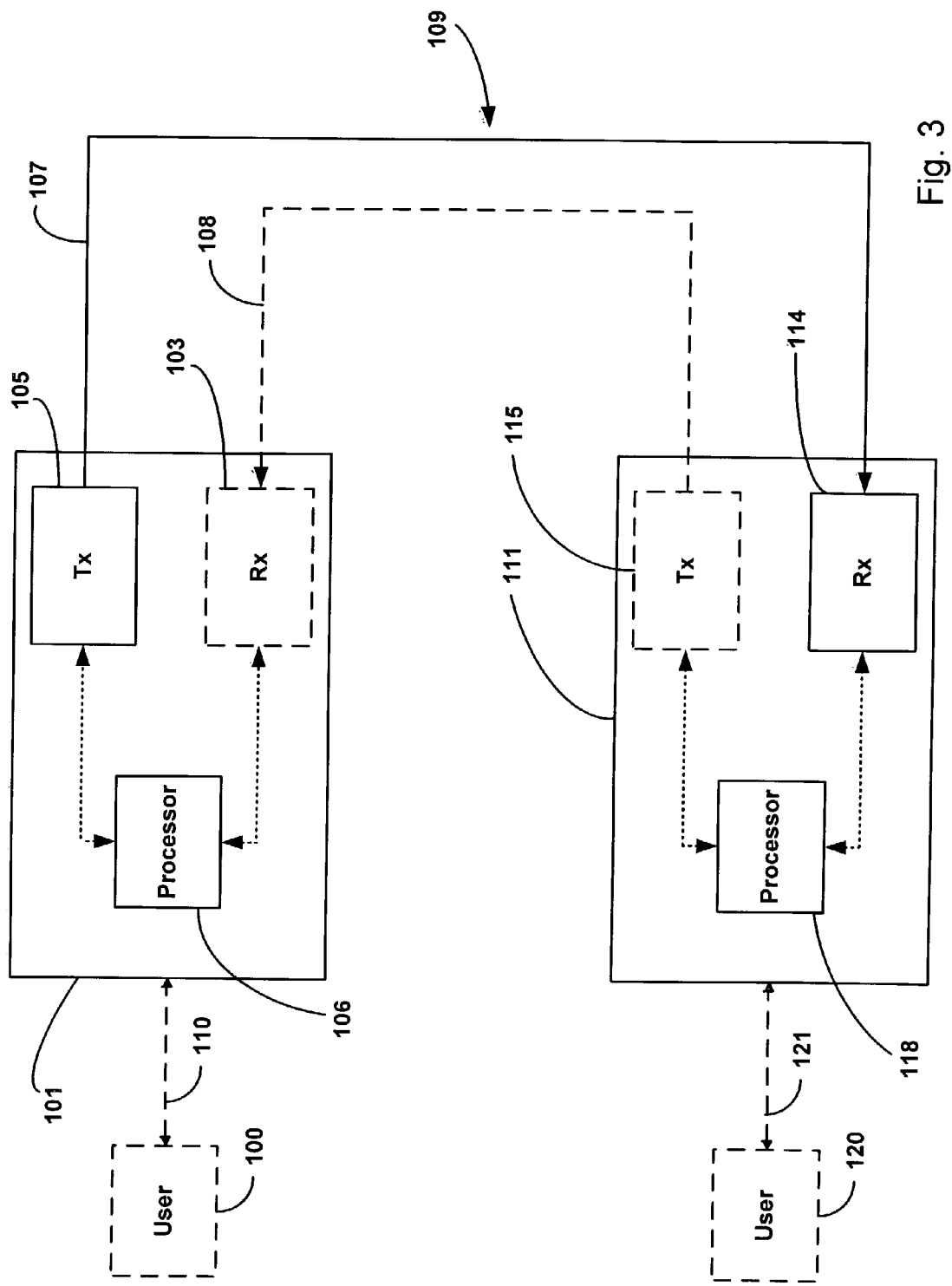
FIG. 3 illustrates a block diagram of a generic communication system that may be employed in connection with the present invention.

FIG. 3 illustrates a block diagram of a generic communication system that may be employed in connection with one embodiment of the present invention. The system comprises a first communication node 101 (a set top box for example), a second communication node 111 (video monitor, display or TV for example), and at least one channel 109 that communicatively couples nodes 101 and 111. The channel 109 may include, for example, wire or fiber cabling, fiber optic cables, connecters, wireless media or any other type of communication method or device adapted to connect at least two communication nodes.

In one embodiment, the first communication node 101 comprises a transmitter 105 (alternatively referred to as "Tx") and a processor 106. The processor 106 may comprise, for example, a microprocessor. The first communication node 101 may, in one embodiment, communicate with a user 100 (e.g., a computer or control device) via an optional communication link 110, and generate one or more transmitted or generated signals 107 communicated via channel 109. One embodiment of the present invention may include an optional receiver 103 generating one or more optional transmitted or generated signals 108 communicated to transmitter 105 via channel 109.

Similarly, the second communication node 111 comprises a receiver 114 (alternatively referred to as "Rx") and a processor 118. The processor 118, like processor 106, may comprise, for example, a microprocessor. The second communication node 111 likewise is communicatively coupled to the at least one channel 109 and adapted to receive signals 107. One embodiment of the present invention may include an optional transmitter 115 communicating with channel 109 and adapted to generated one or more signals 108. The communication node 111 may, in one embodiment, be communicatively coupled to a user 120 (again a computer or control device for example) via optional communication link 121.

During operation of the illustrated embodiment of FIG. 3, information is communicated from the first communication node 101 (a set top box for example) to the second communication node 111 (one or more video monitors, displays or TVs for example) via the at least one channel 109. Specifically, the information is transformed in the transmitter 105 to match the restrictions imposed by the at least one channel 109. The transmitter 105 then communicates the information to the at least one channel 109 as one or more generated signals 107.

The receiver 114 of the second communication node 111 receives the information from the at least one channel 109, transforming it into a form usable by communication node 111.

Communication of information from node 111 to node 101 may be achieved in a similar manner using optional transmitter 115, optional receiver 103 and channel 109. It is contemplated that, in one embodiment, channel 109 comprises an I2C channel (or similar channel) adapted to enable Tx 105 to read/write data to/from Rx 114 using a slow serial protocol for example. In either case, the information transmitted/received may be processed using the processors 106/118.

As provided previously, it is contemplated that the channel 109 may distort one or more of the transmitted signals through attenuation and/or delay. It is contemplated that the one or more signals may be adjusted (using pre-emphasis for example) before transmission in accordance with one embodiment of the present invention, such that the signals at the receiver 114 resemble the intended waveform, almost as if the channel had not contributed any distortion to the signals. In accordance with one embodiment, such pre-emphasis may comprise, but is not limited to, modifying the power over frequency spectrum proportional to the reciprocal of the channel's attenuation; adjusting the time of transmission proportional to the difference in propagation delay, but opposite in sign; or some combination of the two.

It is contemplated that the characteristics of the channel(s) (similar to the channel 109 of FIG. 3) are largely a function of cable length, although other factors such as cable manufacturer, transmitter manufacturer, the source vendor/manufacture/model and display/monitor/TV vendor/manufacturer/model, manufacturer, etc. may be considered. Improving the signal waveform at the receiver improves the pixel error rate and therefore the quality of the displayed video.

In accordance with one embodiment of the present invention, a set of pre-emphasis coefficients and/or parameters may be predetermined for a variety of channel configurations. The pre-emphasis coefficients and/or parameters are selected and used to adjust the one or more signals before transmission, such that the signals at the receiver best resemble the intended waveform. In one embodiment, it is contemplated that such pre-emphasis coefficients and/or parameters are selected prior to or during assembly of the communication system. It is also contemplated that one or more embodiments of the present invention may include an algorithm or other method or device for determining the coefficients after assembly of the communication system or prior to the transmission of the one or more signals.

In accordance with the present invention, there are a plurality of methods contemplated for pre-determining the optimal coefficients. One embodiment comprises storing only one coefficient in a memory, which is used for all channel configurations. Another embodiment comprises storing a plurality of coefficients or parameters in a look-up table or memory, and enabling one or more users to access the look-up table or memory, selecting the optimal pre-emphasis coefficient (prior, during or after assembly of the system, or prior to the transmission of one or more signals) based upon the channel configuration.

Another embodiment comprises training, wherein the transmitter transmits a pseudo-random data sequence. The transmitter coordinates with the receiver, wherein the transmitter reads the pixel error rate from the receiver and uses that information, along with an optimization algorithm to adjust the coefficients. In still another embodiment, the transmitter transmits a plurality of waveforms (e.g., a plurality, pseudo-random data sequences), one waveform for each of the coefficients stored in the memory. Again, the transceiver coordinates with the receiver, wherein the transmitter reads the pixel-error rate for all the transmitted waveforms, and selects the coefficient that results in the lowest pixel error rate. In yet another embodiment, the receiver may be able to determine signal degradation, and communicate such degradation to the transmitter.

Figure 4:
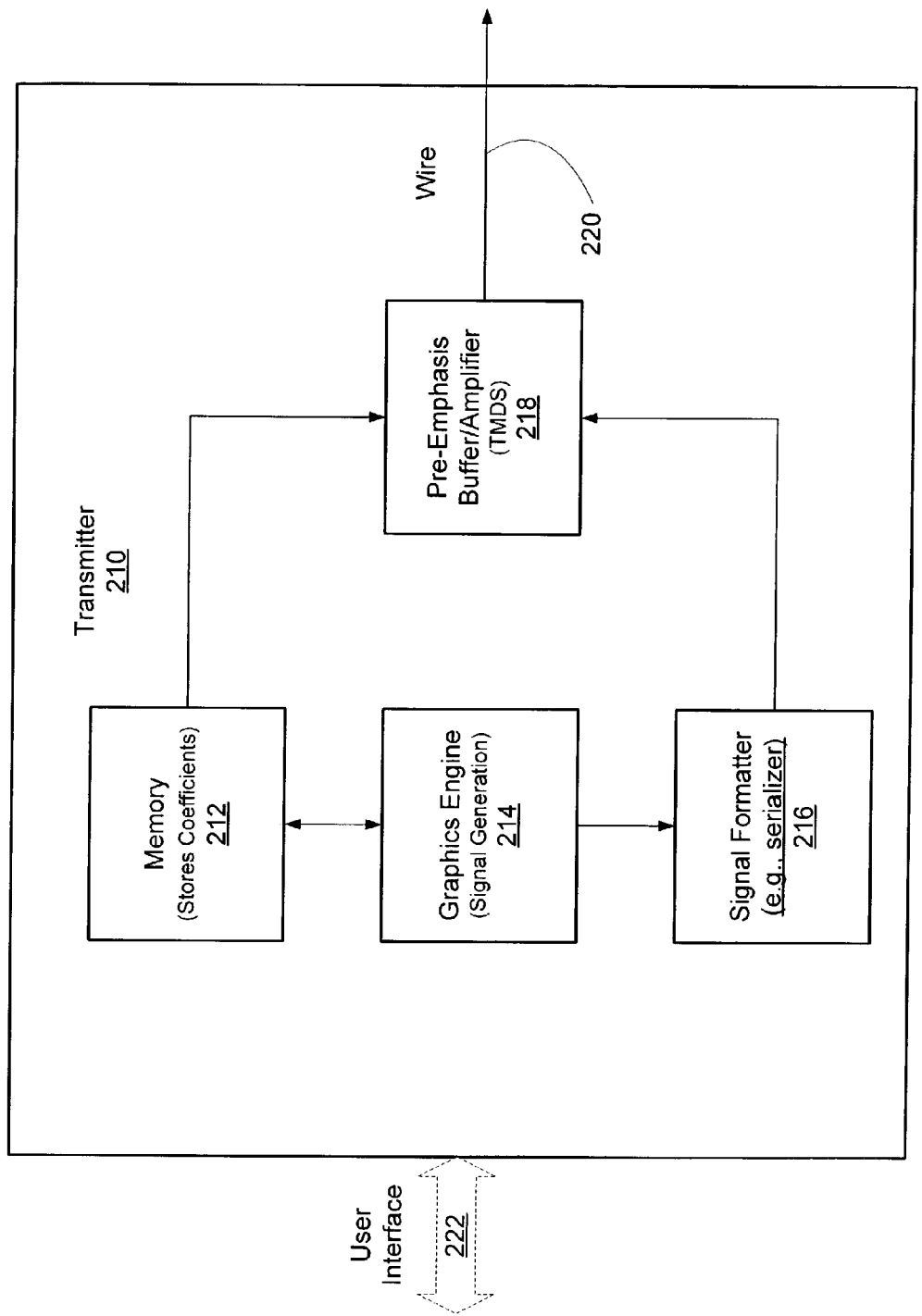
FIG. 4 illustrates a block diagram of one embodiment of a transmitter in accordance with the present invention.

FIG. 4 illustrates a block diagram of a transmitter system 210 in accordance with one embodiment of the present invention. The transmitter 210 may be contained, for example, in one or both of the communication nodes of FIG. 3, as provided previously. Transmitter 210 may comprise a set-top box for example, adapted to communicate with line or wire 220, where line or wire 220 may comprise a communication link or channel.

In this embodiment, transmitter 210 comprises a memory 212 communicating with at least graphics engine 214 and pre-emphasis buffer/amplifier 218. Transmitter 210 further comprises a signal formatter 216 that is adapted to communicate with graphics engine 214 and pre-emphasis buffer/amplifier 218. Pre-emphasis buffer/amplifier 218 is illustrated as being coupled to line or wire 220. An optional user interface 222 is illustrated as being coupled to the transmitter 210.

In this embodiment, memory 212 is adapted to store the one or more coefficients (i.e., a set of coefficients) used to pre-emphasize or adjust the one or more signals prior to transmission. The pre-emphasis buffer/amplifier 218 is adapted to adjust the signals using such coefficients. For example, the pre-emphasis buffer/amplifier may comprise at least an amplifier having one or more variable characteristics. In this exemplary embodiment, the pre-emphasis buffer/amplifier 218 adjusts the gain of the signals in accordance with the coefficients.

The signal generator 214 is adapted to generate one or more signals or data. The signal generator 214, in this embodiment, communicates with the signal formatter 216, and is adapted to reformat the signal for transmission. The signal formatter 216 may comprise a serializer adapted to reformat the signal in a serial format (for example, serializing 8 or 10 bits into one channel). It is also contemplated that the graphics engine 214 may generate and format the signal for transmission (i.e., eliminating the need for a separate signal formatter).

In accordance with one embodiment of the present invention, it may be assumed that the different channels have the same degradation characteristics. In this embodiment, only one coefficient is used for all channel configurations. In another embodiment, it is contemplated at least one set of pre-emphasis coefficients and/or parameters may be predetermined for a variety of channel configurations. In this embodiment, the pre-emphasis coefficients are selected based on the configuration of the channel prior to signal transmission as discussed below with respect to FIGS. 5, 6 and 7. In another embodiment, the user may access a look-up table or memory in the communication system, selecting the optimal pre-emphasis coefficient based upon the channel configuration.

Figure 5:
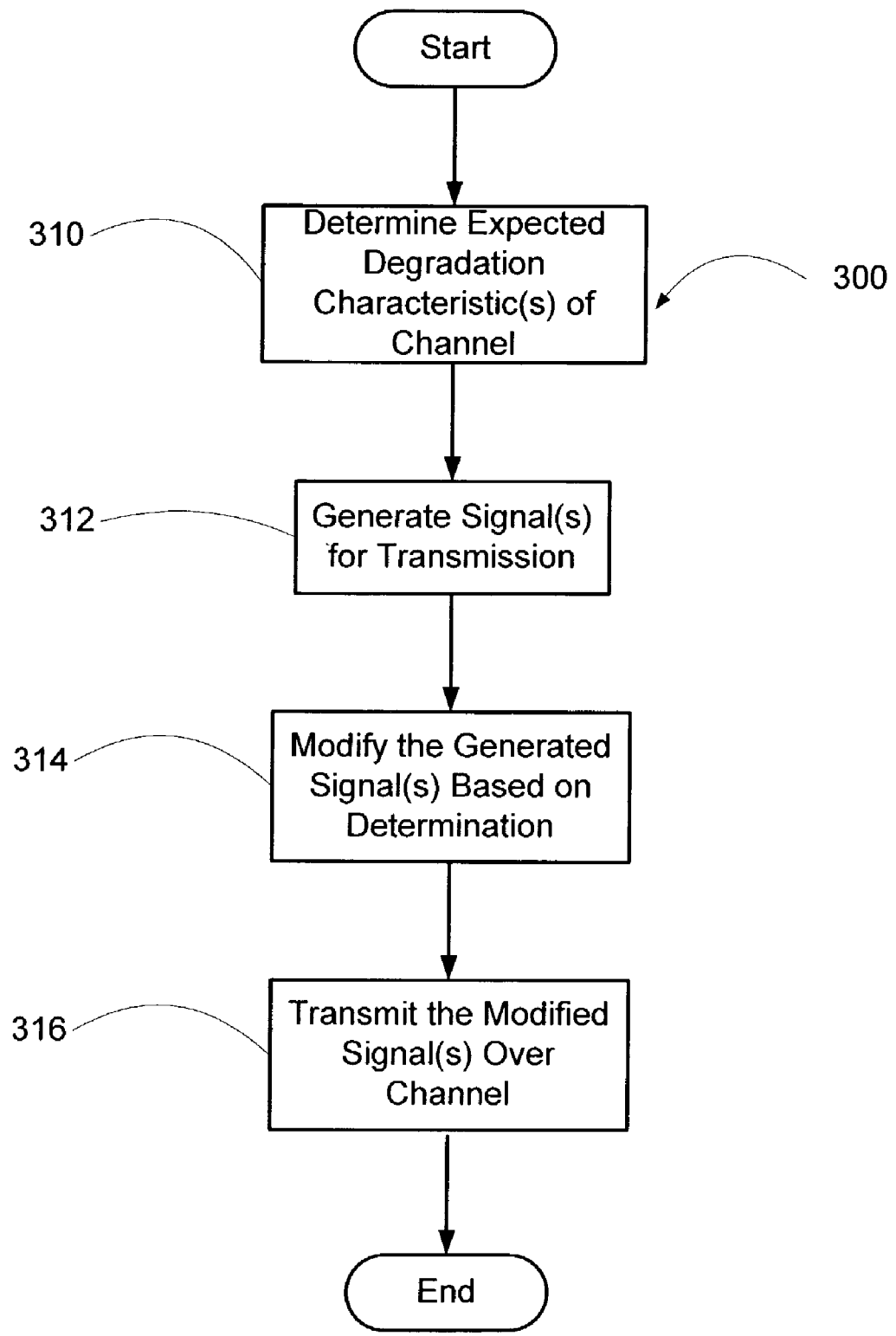
FIG. 5 illustrates a flow diagram of one embodiment of a method of improving a waveform at a receiver in accordance with the present invention.

FIG. 5 illustrates a flow diagram of one embodiment of a method, designated 300, of improving a waveform at a receiver in accordance with the present invention. In this embodiment, the method comprises determining one or more expected degradation characteristics of the one or more channels as illustrated by block 310.

Method 300 further comprises generating one or more signals for transmission as illustrated by block 312. In one embodiment, the one or more signals are generated by a graphics engine in the transceiver, although other methods are contemplated. The one or more generated signals are modified based on the determination as illustrated by block 314. It is contemplated that the characteristics of the channel(s) are largely a function of cable length, although other factors are contemplated as provided previously. Pre-emphasis coefficients and/or parameters are selected and used to adjust the one or more generated signals before transmission, such that the signals at the receiver best resemble the intended waveform. The one or more modified signals are then transmitted as illustrated by block 316.

Figure 6:
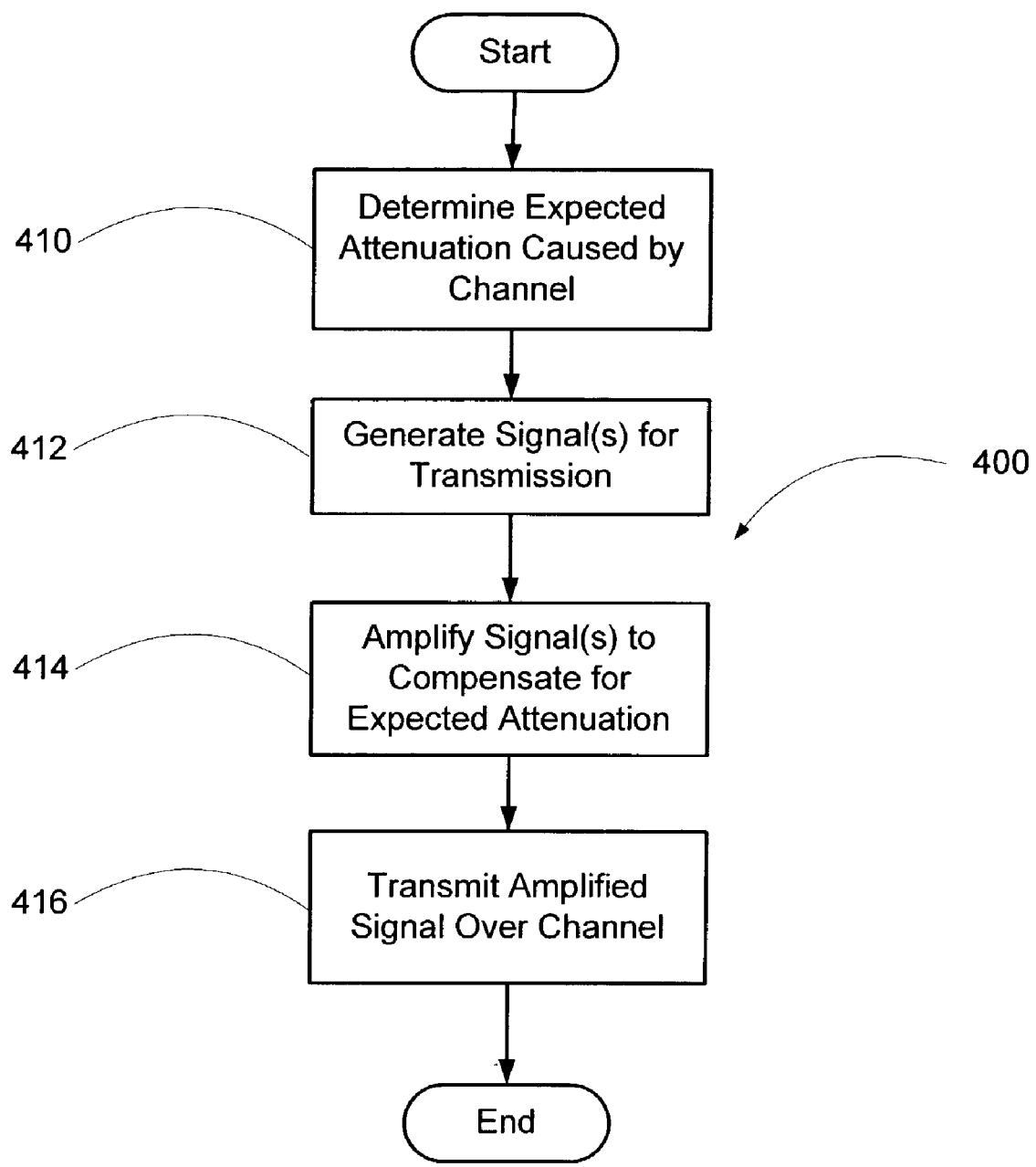
FIG. 6 illustrates a flow diagram of another embodiment of a method of improving a waveform at a receiver in accordance with the present invention.

FIG. 6 illustrates a flow diagram of another embodiment of a method, designated 400, of improving a waveform at a receiver in accordance with the present invention. In this illustrated embodiment, the method comprises determining the expected attenuation caused by the one or more channels as illustrated by block 410.

One or more signals are generated for transmission as illustrated by block 412. The one or more generated signals are modified based on the determination. In this embodiment, the one or more signals are amplified to compensate for the expected attenuation as illustrated by block 414. It is contemplated that the one or more signals are amplified using one or more pre-emphasis coefficients and/or parameters, such that the signals best resemble the intended waveform at the receiver. The one or more amplified signals are then transmitted as illustrated by block 416.

Figure 7:
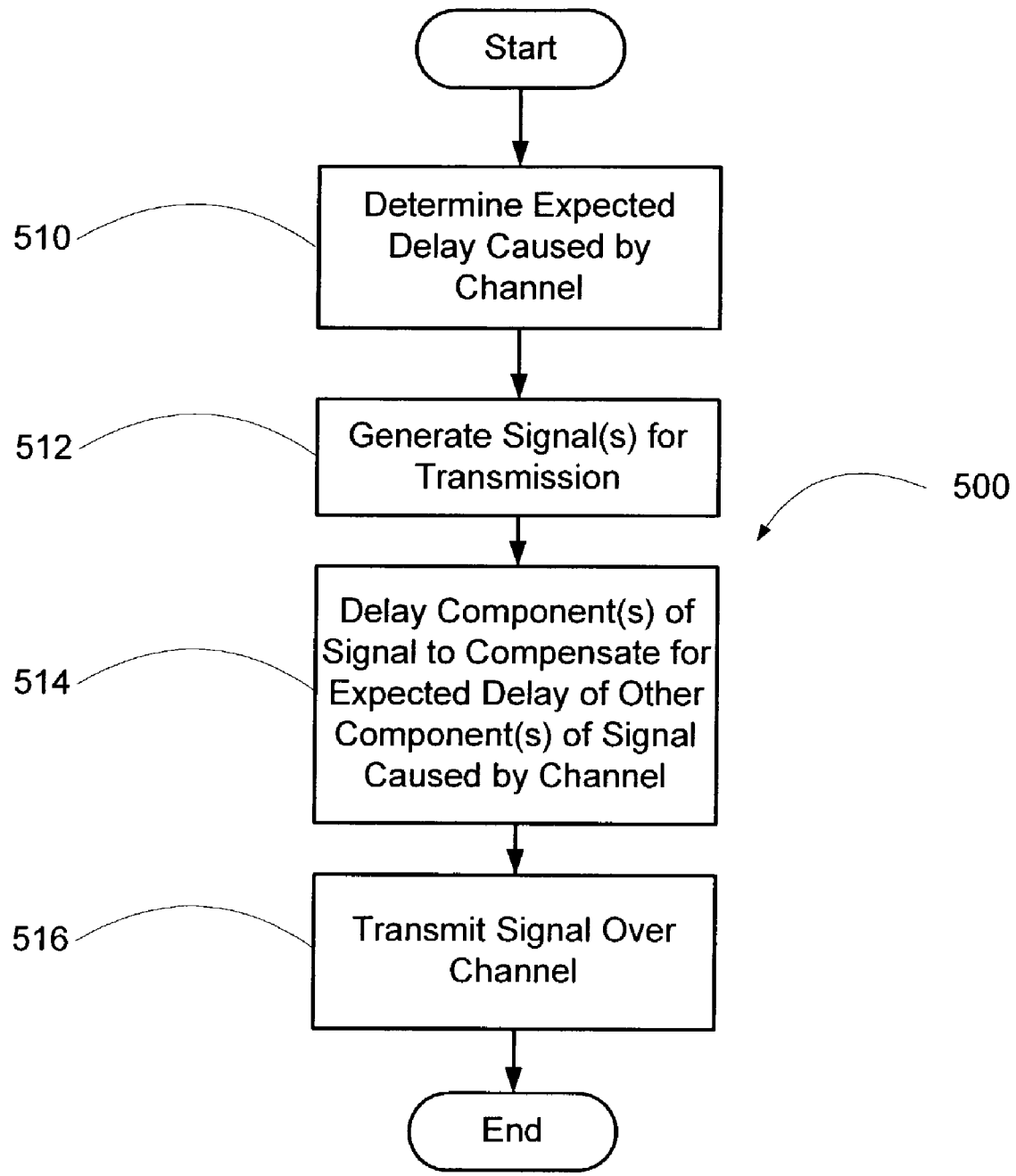
FIG. 7 illustrates a flow diagram of still another embodiment of a method of improving a waveform at a receiver in accordance with the present invention.

FIG. 7 illustrates a flow diagram of yet another embodiment of a method, designated 500, of improving a waveform at a receiver in accordance with the present invention. In this embodiment, method 500 comprises determining the expected delay caused by the one or more channels as illustrated by block 510.

One or more signals are generated for transmission as illustrated by block 512. Again, the one or more generated signals are modified based on the determination. In this embodiment, the one or more signals are delayed to compensate for the expected delay as illustrated by block 514. More specifically one or more components of the signals are delayed to compensate for the expected delay of one or more of the other components of the signals caused by the channel. The one or more signals are then transmitted as illustrated by block 516.

In yet another embodiment, the transmitter transmits one or more pseudo-random data sequences and coordinates with the receiver, wherein the transmitter reads the pixel error rate from the receiver and uses that information, along with an optimization algorithm, to adjust the coefficients as discussed below with respect to FIGS. 8 and 9. In still another embodiment, it is contemplated that the receiver may be able to determine degradation in the one or more waveforms and communicate at least that information to the transmitter as discussed below and illustrated with respect to FIG. 10.

Figure 8:
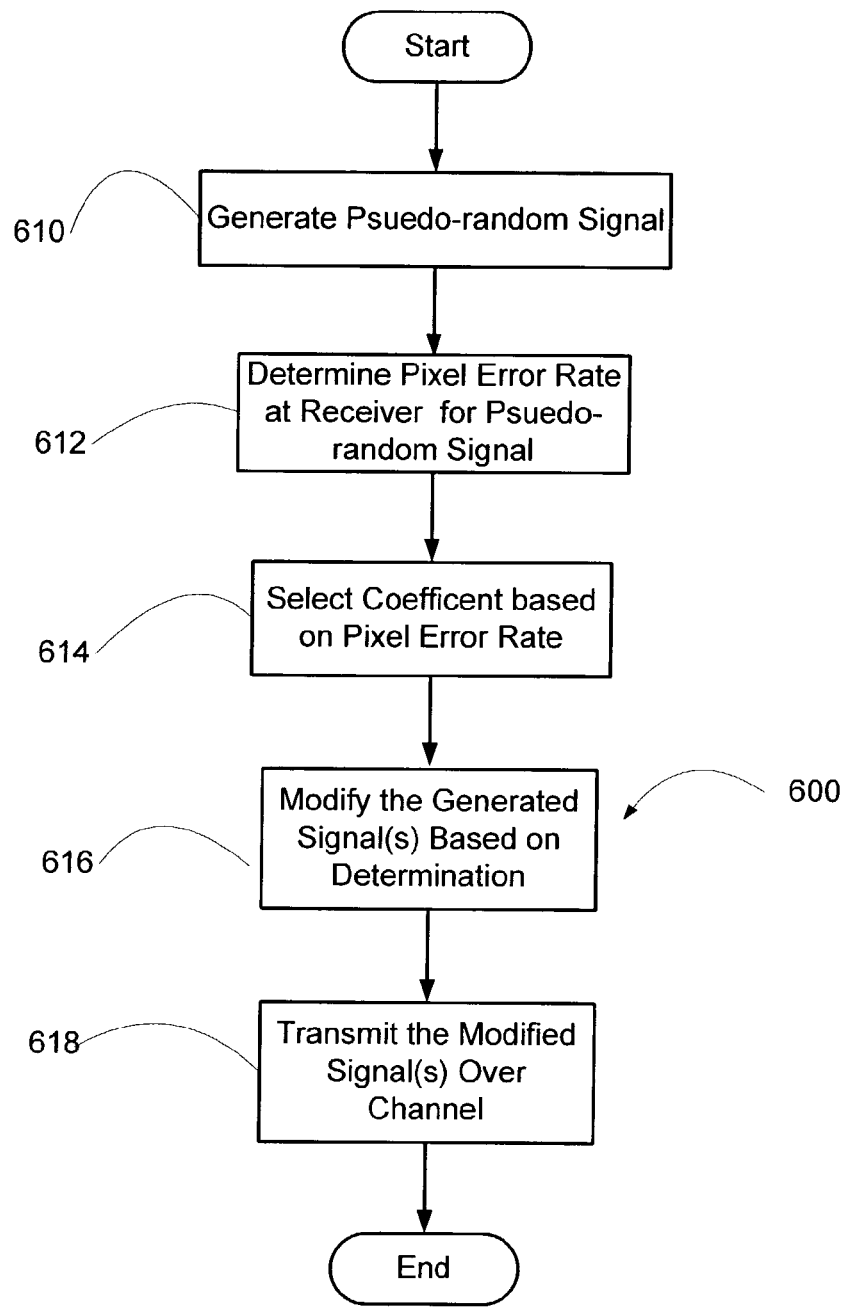
FIG. 8 illustrates a flow diagram of yet another embodiment of a method of improving a waveform at a receiver in accordance with the present invention.

FIG. 8 illustrates a flow diagram of one embodiment of a method, designated 600, of improving a waveform of a receiver in accordance with the present invention. As illustrated, the method comprises generating a pseudo-random signal for transmission over the one or more channels as illustrated by block 610.

In this embodiment, the receiver determines the pixel error rate for the pseudo-random signal as illustrated by block 612. One or more coefficients are selected based on the pixel error rate as illustrated by block 614. It is contemplated that the one or more coefficients are selected resulting in the signals best resembling the intended waveform at the receiver. It is also contemplated that a user for example selects the one or more coefficients based on such pixel error rate. However, embodiments are contemplated wherein the transmitter selects the coefficients. In either embodiment, the one or more signals are modified based on such determination as illustrated by block 616. The one or more modified signals are transmitted as illustrated by block 618.

Figure 9:
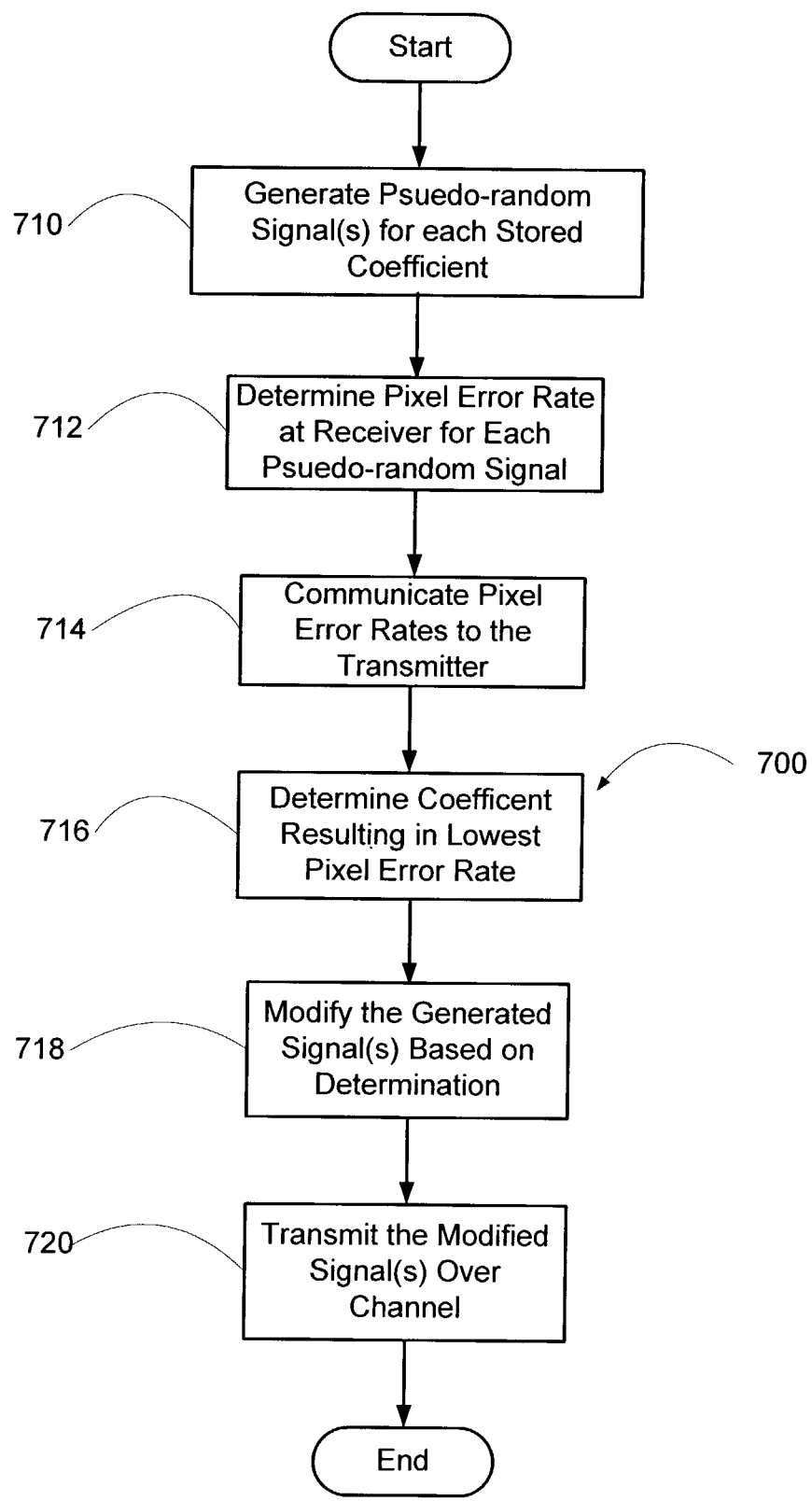
FIG. 9 illustrates a flow diagram of another embodiment of a method of improving a waveform at a receiver in accordance with the present invention.

FIG. 9 illustrates a flow diagram of another embodiment of a method, designated 700, of improving a waveform at a receiver in accordance with the present invention. In this illustrated embodiment, the method comprises generating a plurality of pseudo-random signals for transmission over the one or more channels as illustrated by block 710, wherein one or more pseudo-random signal(s) is generated and transmitted for each stored coefficient and/or parameter.

The receiver determines the pixel error rate for each of the pseudo-random signals as illustrated by block 712, transmitting such pixel error rates to the transmitter as illustrated by block 714. One or more coefficients are selected based on the pixel error rate as illustrated by block 716. The transmitter selects the one or more coefficients resulting in the signals at the receiver that best resemble the intended waveform (i.e., have the lowest pixel error rate). In this embodiment, one or more signals are modified based on such determination as illustrated by block 718. The one or more modified signals are transmitted as illustrated by block 720.

Figure 10:
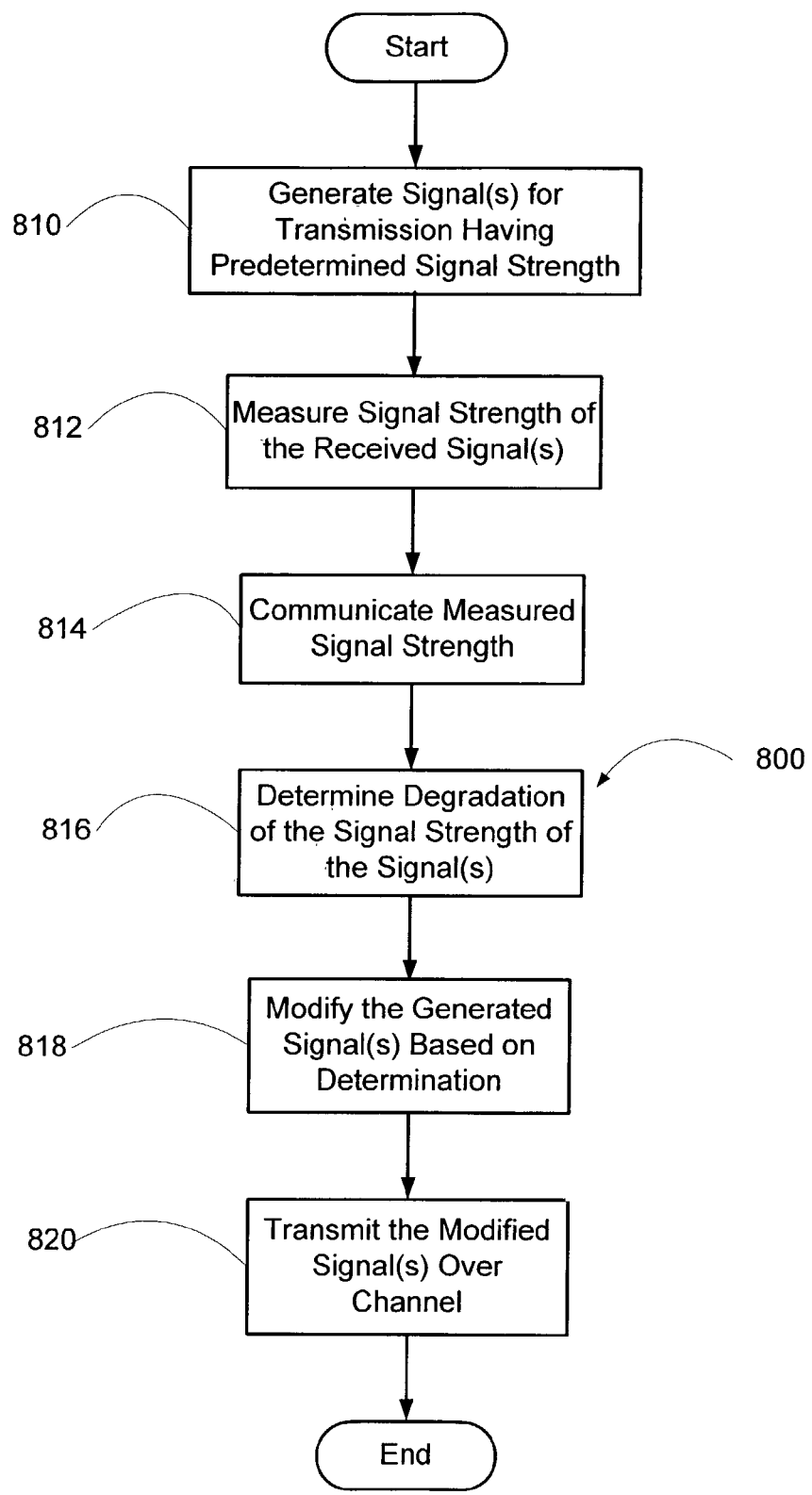
FIG. 10 illustrates a flow diagram of still another embodiment of a method of improving a waveform at a receiver in accordance with the present invention.

FIG. 10 illustrates a flow diagram of another embodiment of a method, designated 800, for improving a waveform at a receiver in accordance with the present invention. In this illustrated embodiment, the method comprises generating one or more signals having a predetermined signal strength for transmission over the one or more channels as illustrated by block 810.

The signal strength of the one or more signals is measured at the receiver as illustrated by block 812, and such measured signal strength is communicated to the transmitter as illustrated by block 814. In this embodiment, the transmitter determines the degradation of the signal strength of the signals, and modifies the one or more generated signals based on such determination as illustrated by blocks 816 and 818. In one embodiment, the transmitter or user determines the degradation in the channel based on the difference between the predetermined signal strength and the measured signal strength. The transmitter then selects at least one coefficient from a plurality of stored coefficients that results in the signals at the receiver best resembling the intended waveform (i.e., have the least difference between the predetermined signal strength and received signal strength). The one or more modified signals are transmitted as illustrated by block 820.

Another embodiment of the present invention may be used with the High Definition Multimedia Interface (alternatively refereed to as the "HDMI") standard and other proposals to extend the capability of the DVI link, each of which is incorporated herein by reference in their entirety. Such HDMI and other proposals contemplate including a protocol adapted to include auxiliary data during the video blanking periods. In such usage models, one or more pseudo-random or training patterns may be transmitted as auxiliary data. Because this data has a pre-defined pattern, the receiver can calculate an error rate and make this information available to the transmitter over the channel, such as a I2C channel for example. It is contemplated that it would be possible to monitor and adjust the channel performance while the channel is in use. Many modifications and variations of the present invention are possible in light of the above teachings. Thus, it is to be understood that, within the scope of the appended claims, the invention may be practiced otherwise than as described hereinabove.

What is claimed:

1. A transmitter comprising:
   a memory adapted to store at least one coefficient that is pre-determined based at least in part on at least one expected degradation characteristic of a channel;
   a pre-emphasizer communicating with at least said memory and the channel, and adapted to modify at least one signal using said at least one coefficient prior to transmission of said at least one signal over said channel, to compensate for said at least one expected degradation characteristic; and
   a graphics engine communicating with at least said memory and adapted to generate said at least one signal.

2. The transmitter of claim 1 wherein said at least one expected degradation characteristic comprises at least one of attenuation and delay.

3. The transmitter of claim 1 wherein said pre-emphasizer comprises a buffer amplifier.

4. The transmitter of claim 1 comprising a signal formatter communicating with at least said pre-emphasizer and adapted to format said at least one signal.

5. The transmitter of claim 1 comprising a user interface communicating therewith and adapted to select said at least one coefficient.

6. A method for improving a waveform at a receiver, comprising:
   determining at least one expected degradation characteristic of a channel;
   generating a signal for transmission;
   modifying said generated signal based on said determination;
   after said modifying, transmitting said modified signal over the channel with a transmitter; and
   wherein modifying said generated signal comprises adjusting a time of transmission proportional to a difference in propagation delay of said channel.

7. The method of claim 6 comprising modifying said generated signal using at least one coefficient based at least in part on said expected degradation characteristic.

8. The method of claim 6 wherein modifying said generated signal comprises modifying a power over frequency spectrum proportional to a reciprocal of attenuation of said channel.

9. The method of claim 8 wherein determining said at least one expected degradation characteristic comprises determining at least one of attenuation and delay of said channel.

10. A method for improving a waveform of a receiver, comprising:
    generating a plurality of test signals for transmission over at least one channel;
    determining a pixel error rate for each of said test signals;
    selecting at least one coefficient from a plurality of coefficients based at least in part on at least one of said pixel error rates;
    modifying at least one signal using said at least one coefficient; and
    after said modifying, transmitting said at least one modified signal over said at least one channel; and
    wherein each of said test signals is generated using a respective one of said plurality of coefficients, and wherein selecting at least one coefficient comprises selecting the coefficient whose respective signal results in the lowest pixel error rate.

11. The method of claim 10 wherein said test signals comprises pseudo-random signals.

* * * * *